United States Patent [19]

Carignan

[11] 4,012,956
[45] Mar. 22, 1977

[54] FLOW METER

[75] Inventor: Eugene Carignan, Pawtucket, R.I.

[73] Assignee: Lawrence Peska Associates, Inc., New York, N.Y.

[22] Filed: Apr. 28, 1976

[21] Appl. No.: 681,071

[52] U.S. Cl. .................................................. 73/201
[51] Int. Cl.² ......................................... G01F 15/18
[58] Field of Search .................... 73/201, 198, 229; 285/80, 81, 87

[56] References Cited

UNITED STATES PATENTS

| 74,254 | 2/1868 | Taggart | 73/229 |
|---|---|---|---|
| 2,037,278 | 4/1936 | Siber | 73/229 |

Primary Examiner—James J. Gill
Assistant Examiner—Anthony V. Ciarlante

[57] ABSTRACT

A flow meter is disclosed which is securable to the butt end of a pipe such as a filler tube for domestic fuel oil tanks. The meter comprises a housing which is threadably securable to the butt end of a pipe through a first opening in the housing. A transverse opening is provided in the housing for the insertion of a flow meter through the first opening and a U-shaped cutout in the pipe to which the housing is threadably secured. A door is provided over the top of the housing and the first opening, the door being lockable to the housing so that the meter and housing may not be unscrewed from the pipe, the door also comprising a lockable cap over the butt end of the pipe.

3 Claims, 3 Drawing Figures

FLOW METER

SUMMARY OF THE INVENTION

The present invention relates to a flow meter adapted to be placed on the butt end of a pipe and comprises a meter housing, a first opening in the housing for threadably engaging threads on the butt end of a pipe. A second opening is also provided in the housing, the longitudinal axis of the second opening being substantially transverse to the longitudinal axis of the first opening. A door which is openably secured to the top of the housing extends over the first opening. A lock is also provided for locking the door over the first opening and the housing. A flow meter is provided which is removably insertable in the housing through the door and into the first opening when the housing is threadably secured onto the butt end of a threaded pipe, the end of such pipe having a U-shaped cutout for receiving the meter, whereby the meter may be placed in the housing and in the pipe to measure fluid in the pipe, and the hinged door may be locked to prevent removal of the meter from the pipe and to seal the butt end of the pipe.

In another embodiment, a flange is provided which extends from the housing next adjacent the first opening for lockingly securing the door to the flange, the door extending over the flange, openings being provided in the door and the flange for receiving a lock.

The flow meter is especially useful for attachment to the filler pipe of a domestic fuel oil tank.

DETAILED DESCRIPTION

Figure 1:
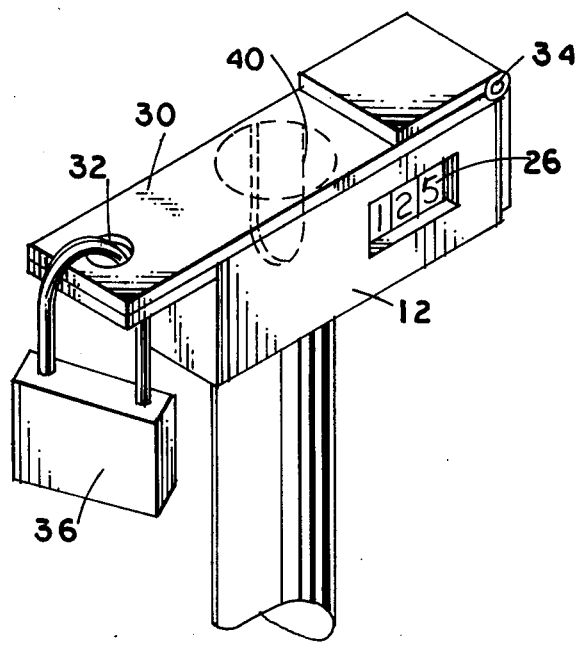
FIG. 1 is a perspective view illustrating a flow meter which may be secured to and locked to the butt end of a pipe, the meter also integrating a cover thereon for capping the end of the pipe according to one embodiment of the present invention.
Figure 3:
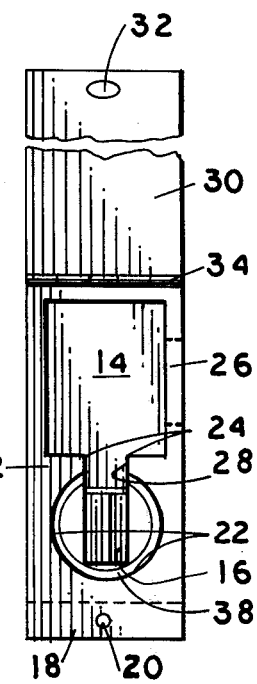
FIG. 3 is a plan view partially in section taken along the line 3—3 of FIG. 2.
Figure 2:
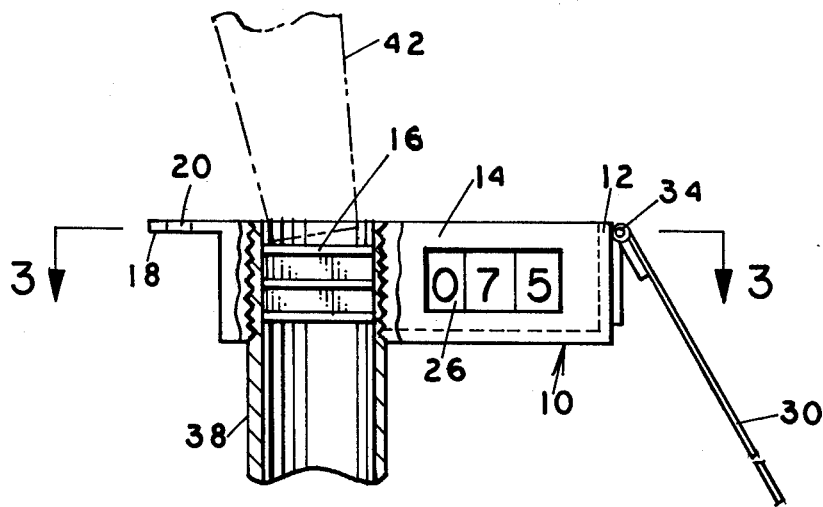
FIG. 2 is a side elevation partially in section illustrating a flow meter of the present invention secured to the butt end of a pipe.

Flow meters for measuring a quantity of fluid passed through a pipe into a container are disclosed in the prior art U.S. Pat. Nos. 3,350,937 Brewer; 3,190,117 Whitman; 3,309,973 Williams; 2,897,672 Glasbrenner, et al.; 2,696,113 Prescott et al.; and, 2,037,278 Siber.

None of the above references disclose apparatus for measuring the flow through a pipe which may be readily mounted on the pipe and locked to the pipe. The reference to Siber illustrates a flow meter which has a pipe-like extension leading from either side of the turbine wheel used to operate the meter mechanism; however, does not suggest nor teach apparatus which may be permanently attached or lockably attached to a pipe.

Because of the high price of fuel oil, many homeowners are interested in having some means for checking the amount of fuel oil delivered. Various flow meters may be placed on the delivery pipe or filler tube of a domestic fuel oil tank. None of the devices suggested by the prior art disclose a meter that may be conveniently locked to a filler pipe or in which the metering device, locking device and cap for the filler pipe are constructred as one unit in order to minimize the cost of production.

It is therefore an object of the present invention to overcome these and other difficulties encountered in the prior art.

It is also an object of the present invention to provide a novel flow meter especially a flow meter readily attached to a domestic fuel oil filler pipe and which may be locked to the filler pipe to prevent its removal.

It is a further object of the present invention to provide a flow meter of the foregoing description which also integrates in its construction a cap for a filler pipe in which the cap may be locked to the housing of the flow meter.

These and other objects have been achieved according to the present invention and will become apparent by reference to the disclosure and claims that follow as well as the appended drawing.

A flow meter 10 is illustrated comprising a housing 12 having a flow meter mechanism 14 therein with an impeller wheel 16 operably connected to the flow meter mechanism. A display window 26 is provided in the housing 12 for allowing the meter to be read through the housing.

The housing 12 has a first opening therein 22 for threadably receiving the butt end of threaded pipe 38, a second opening 24 also being provided in the housing 12, the second opening having a longitudinal axis substantially transverse to the longitudinal axis of the first opening 22. The flow meter 14 has a neck 28 thereon which is insertable through a U-shaped cutout 40 in pipe 38 and the opening 24 for holding the flow meter mechanism 14 securely in place in the opening 24 and the U-shape cutout section of the pipe 38 when the mechanism 14 is in place. A flange 18 extends from the housing 12 next adjacent the opening 22, flange 18 having an opening 20 therein. A door 30 is hingedly secured to housing 12 by means of piano hinge 34 an opening 32 being provided in door 30 which is registrable with the opening 20 in flange 18 when the door is closed as illustrated in FIG. 1. A padlock 36 may be used to lockably secure door 30 to the housing 12 through openings 32 and 20.

In use, a threaded pipe 38 is provided with a U-shaped cutout 40 extending from the butt end of the pipe 38 downwardly so that when meter mechanism 14 is removed, housing 12 may be threadably secured to the butt end of pipe 38. The opening 40 and the opening 24 are registered with one another after which flow meter mechanism 14 is inserted into the housing 12 through the open door 30, the impeller blades 16 being passed through opening 24 and into opening 40 so that the collar 28 of the meter mechanism 14 is securely inserted into both the opening 24 and the opening 40 thereby preventing the housing 12 from being turned in either direction on the threads of pipe 38. Door 30 may then be closed over the opening in the housing into which the flow meter mechanism 14 is inserted as well as the opening in the butt end of pipe 38 to thereby seal the end of pipe 38. Lock 36 may then be used to lock the door 30 to the flange 18 through openings 32 and 20. When fluid is introduced into pipe 38 through nozzle 42, the lock is removed and the door 30 opened after which the nozzle 42 is removed and the door 30 locked in the manner previously described.

Although the invention has been described by reference to some embodiments, it is not intended that the flow meter be limited thereby but that modifications thereof are intended to be included as falling within the broad scope and spirit of the foregoing disclosure the following claims and the appended drawing.

What is claimed is:

1. A flow meter adapted to be placed on the butt end of a pipe comprising meter housing means, first opening means in said housing for threadably engaging thread means on the butt end of a pipe, second opening means in said housing, the longitudinal axis of which is substantially transverse to the longitudinal axis of said first opening, a door means operably secured to the top of said housing and extending over said first opening, lock means for locking said door over said first opening and to said housing, flow meter means removably insertable in said housing through said door and into said first opening whereby said housing is threadly securable to the butt end of a threaded pipe, the end of said pipe having a U-shaped cutout for receiving said meter and when the meter is placed in said housing and in said pipe, fluid flow in said pipe may be measured, and said hinged door may be locked to preventremoval of said meter from the pipe and to seal the butt end of the pipe.

2. The flow meter of claim 1 further comprising a flange extending from said housing next adjacent said first opening, means for lockingly securing said door to said flange.

3. The flow meter of claim 2 where said door extends over said flange, opening means in said door and said flange for receiving a lock for locking said door to said flange.

* * * * *